United States Patent
Matejka et al.

(10) Patent No.: US 10,694,071 B2
(45) Date of Patent: Jun. 23, 2020

(54) TECHNIQUES FOR VIEWING AND SEARCHING DOCUMENTS FROM COLLECTIONS OF DOCUMENTS

(71) Applicant: AUTODESK, INC., San Rafael, CA (US)

(72) Inventors: Justin Frank Matejka, Newmarket (CA); George Fitzmaurice, Toronto (CA); Tovi Grossman, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 511 days.

(21) Appl. No.: 14/542,402

(22) Filed: Nov. 14, 2014

(65) Prior Publication Data

US 2015/0154188 A1  Jun. 4, 2015

Related U.S. Application Data

(60) Provisional application No. 61/911,301, filed on Dec. 3, 2013.

(51) Int. Cl.
   *H04N 1/00* (2006.01)
   *H04N 1/387* (2006.01)
   (Continued)

(52) U.S. Cl.
   CPC ......... *H04N 1/3871* (2013.01); *G06F 16/743* (2019.01); *G06F 16/93* (2019.01);
   (Continued)

(58) Field of Classification Search
   CPC ......... G06F 17/30011; G06F 17/30849; G06F 17/509; G06F 3/0482; G06F 3/0484;
   (Continued)

(56) References Cited

U.S. PATENT DOCUMENTS

| 6,873,343 B2 * | 3/2005 | Chui | H04N 1/3875 345/589 |
| 7,870,224 B1 * | 1/2011 | Maigatter | G06T 11/60 709/217 |

(Continued)

OTHER PUBLICATIONS

Alexander, et al., "Revisiting Read Wear: Analysis, Design, and Evaluation of a Footprints Scrollbar", CHI Apr. 8, 2009, Desktop Techniques, pp. 1665-1674.

(Continued)

*Primary Examiner* — Diedra McQuitery
(74) *Attorney, Agent, or Firm* — Artegis Law Group, LLP (57) ABSTRACT

A computing device is configured to generate a graphical user interface (GUI) that allows an end-user to search for particular document or documents within a large collection of documents. The GUI provides a view of the overall document collection and affords the end-user the ability to reduce the number of visual document thumbnails by means of keyword search. When the end-user identifies a candidate among the reduced number of thumbnails, the end-user may select the page view of the candidate document and conduct further review. If the selected candidate is not the target document, the end-user may select adjacent documents to seamlessly transition between reading and searching. An advantage to this approach is that the visual qualities of the documents, such as images, graphical layout, and color, among others, may be incorporated into the search process. Searching for a particular target document is, thus, expedited.

21 Claims, 8 Drawing Sheets

(51) Int. Cl.

| | |
|---|---|
| *G06F 16/93* | (2019.01) |
| *G06F 16/74* | (2019.01) |
| *H04N 21/4728* | (2011.01) |
| *H04N 1/393* | (2006.01) |
| *G06F 3/0482* | (2013.01) |
| *H04L 12/24* | (2006.01) |

(52) U.S. Cl.
CPC ....... *H04N 1/3935* (2013.01); *H04N 21/4728* (2013.01); *G06F 3/0482* (2013.01); *H04L 41/22* (2013.01)

(58) Field of Classification Search
CPC ....... G06F 3/04817; G06F 8/34; G11B 27/10; H04L 41/22
USPC .......................... 707/722; 715/835, 837, 838
See application file for complete search history.

(56) References Cited

U.S. PATENT DOCUMENTS

| | | | | |
|---|---|---|---|---|
| 8,954,477 | B2* | 2/2015 | Agnoli ................ | G11B 27/031 707/803 |
| 2008/0222570 | A1* | 9/2008 | MacLaurin ......... | G06F 16/9535 715/839 |
| 2009/0031218 | A1* | 1/2009 | Wang ........................ | G06F 3/14 715/273 |
| 2009/0067724 | A1* | 3/2009 | Hirohata .............. | G03G 21/046 382/190 |
| 2009/0222412 | A1* | 9/2009 | Lee ................... | G06F 17/30398 |
| 2011/0184950 | A1* | 7/2011 | Skaff ................. | G06F 17/30265 707/737 |
| 2011/0295879 | A1* | 12/2011 | Logis .................. | G06F 16/9574 707/769 |
| 2013/0194294 | A1* | 8/2013 | Zhao ................. | G06F 17/30389 345/619 |
| 2014/0075294 | A1* | 3/2014 | Hadley ................. | G06F 40/106 715/243 |
| 2014/0279982 | A1* | 9/2014 | Eames ................. | H04N 1/3872 707/695 |
| 2014/0282011 | A1* | 9/2014 | Dellinger .............. | G06F 3/0482 715/731 |

OTHER PUBLICATIONS

André, et al., "Discovery Is Never by Chance: Designing for (Un)Serendipity", Creativity and Cognition, Oct. 26-30, 2009, 10 pages.
Aris, et al., "Visual Overviews for Discovering Key Papers and Influences Across Research Fronts", Journal of the American Society for Information Science and Technology, 60(11), 2009, pp. 2219-2228.
Bailer, et al., "Video Content Browsing Based on Iterative Feature Clustering for Rushes Exploration", TRECVID Workshop, May 2011, pp. 230-239.
Barnes, et al., "Video Tapestries with Continuous Temporal Zoom", ACM SIGGRAPH. Article 89, Jul. 2010, 9 pages.
Bederson, "Interfaces for Staying in the Flow", Ubiquity, Sep. 2004, 8 pages.
Bederson, et al., "Pad++: A Zooming Graphical Interface for Exploring Alternate Interface Physics", UIST, Jan. 1994, 10 pages.
Brandt, et al., "Example-Centric Programming: Integrating Web Search into the Development Environment", CHI 2010 End-User Programming I, Apr. 10-15, 2010, pp. 513-522.
Byrd, "A Scrollbar-based Visualization for Document Navigation", Proceedings of the Fourth ACM Conference on Digital Libraries, 1999, 8 pages.
Cao, et al., "FacetAtlas: Multifaceted Visualization for Rich Text Corpora", IEEE Transactions on Visualization and Computer Graphics, 16(6), 2010, pp. 1172-1181.
Card, et al., "The WebBook and the Web Forager: An Information Workspace for the World-Wide Web", Human factors in computing systems, 1996, 11 pages.
Divakaran, et al., "Augmenting Fast-Forward and Rewind for Personal Digital Video Recorders", IEEE ICCE, 2005, 5 pages.
Dunne, et al., "GraphTrail: Analyzing Large Multivariate, Heterogeneous Networks while Supporting Exploration History", CHI May 5-10, 2012, 10 pages.
Dunne, et al., "Rapid Understanding of Scientific Paper Collections: Integrating Statistics, Text Analytics, and Visualization", Computational Linguistics, 2011, 31 pages.
Giles, et al., "CiteSeer: An Automatic Citation Indexing System", Third ACM Conference on Digital Libraries, 1998, pp. 89-98.
Girgensohn, et al., "DocuBrowse: Faceted Searching, Browsing, and Recommendations in an Enterprise Context", Feb. 7-10, 2010, 10 pages.
Gove, et al., "Evaluating Visual and Statistical Exploration of Scientific Literature Networks", IEEE VLHCC, 2011, 8 pages.
Gray, et al., "Milliseconds Matter: An Introduction to Microstrategies and to Their Use in Describing and Predicting Interactive Behavior", Journal of Experimental Psych., 6(4), 2000, pp. 322-335.
Grossman, et al., "Chronicle: Capture, Exploration, and Playback of Document Workflow Histories", UIST, Oct. 3-6, 2010, pp. 143-152.
Hearst, "UIs for Faceted Navigation Recent Advances and Remaining Open Problems", Interfaces, 2008, 5 pages.
Hong, et al., "Turning Pages of 3D Electronic Books", IEEE Symposium on 3D User Interfaces, Mar. 25-26, 2006, pp. 159-165.
Howland, et al., "How Scholarly Is Google Scholar? A Comparison to Library Databases", College & Research Libraries, 70(3), 2009, pp. 227-234.
Hürst, "Interactive Audio-Visual Video Browsing", ACM MM, Oct. 23-27, 2006, 4 pages.
Hürst, et al., "Quantity versus Quality—The Role of Layout and Interaction Complexity in Thumbnail-based Video Retrieval Interfaces", ICMR, Jun. 5-8, 2012, 8 pages.
Jackson, et al., "Panopticon: A Parallel Video Overview System", ACM UIST, Oct. 8-11, 2013, pp. 8.
Janin, et al., "Joke-o-mat HD: Browsing Sitcoms with Human Derived Transcripts", ACM Multimedia, 2010, 3 pages.
Jeng, "What Is Usability in the Context of the Digital Library and How Can It Be Measured?" Information Technology and Libraries, 24(2), Jun. 2005, pp. 47-56.
Lee, et al., FacetLens: Exposing Trends and Relationships to Support Sensemaking within Faceted Datasets, CHI, Apr. 4-9, 2009, 10 pages.
Lee, et al., "Understanding Research Trends in Conferences using PaperLens", CHI Apr. 2-7, 2005, pp. 1969-1972.
Matejka, et al., "Citeology: Visualizing Paper Genealogy", CHI Extended Abstracts, May 5-10, 2012, 9 pages.
Matejka, et al., "Swift: Reducing the Effects of Latency in Online Video Scrubbing", ACM CHI, May 5-10, 2012, 10 pages.
Matejka, et al., "Swifter: Improved Online Video Scrubbing", ACM CHI, Apr. 27-May 2, 2013, pp. 1159-1168.
Nel, "Large Image Support in Digital Repositories", Master of Philosophy, Department of Computer Science, University of Cape Town, Jan. 2010, 92 pages.
Pietriga, "A Toolkit for Addressing HCI issues in Visual Language Environments", VLHCC Oct. 2005, 9 pages.
Pirolli, "Information Foraging in Information Access Environments", Creativity, Jan. 1995, 10 pages.
Plaisant, "The Challenge of Information Visualization Evaluation", AVI, 11(4), 2004, 8 pages.
Pongnumkul, "Content-Aware Dynamic Timeline for Video Browsing", ACM UIST, Oct. 3-6, 2010, pp. 139-142.
Ramos, et al., "Fluid Interaction Techniques for the Control and Annotation of Digital Video", ACM UIST, 2003, pp. 105-114.
Rooke, et al., "AppMap: Exploring User Interface Visualizations", Graphics Interface 2011, pp. 111-118.
Schoeffmann, et al., "The Video Explorer—A Tool for Navigation and Searching within a Single Video based on Fast Content Analysis", ACM SIGMM, Feb. 22-23, 2010, 12 pages.

(56) References Cited

OTHER PUBLICATIONS

Strobelt, et al., "Document Cards: A Top Trumps Visualization for Documents", InfoVis, Jul. 27, 2009, 8 pages.
Teevan, et al., "Visual Snippets: Summarizing Web Pages for Search and Revisitation", CHI, 2009, 11 pages.
Truong, et al., "Video Abstraction: A Systematic Review and Classification" ACM Transactions on Multimedia Computing Communications and Applications, vol. 3, No. 1, Article 3, Feb. 2007, 37 pages.
Tse, et al., "Dynamic Key Frame Presentation Techniques for Augmenting Video Browsing", ACM AVI, 1998, pp. 185-194.
Wexelblat, et al., "Footprints: History-Rich Tools for Information Foraging", CHI, 1999, 8 pages.
Woodruff, et al., "Using Thumbnails to Search the Web", SIGCHI Mar. 31-Apr. 4, 2001, 8 pages.

\* cited by examiner

TECHNIQUES FOR VIEWING AND SEARCHING DOCUMENTS FROM COLLECTIONS OF DOCUMENTS

CROSS-REFERENCE TO RELATED APPLICATIONS

This application claims the benefit of U.S. provisional patent application titled "Techniques for Viewing and Searching Different Types of Content," filed on Dec. 3, 2013 and having Ser. No. 61/911,301. The subject matter of this related application is hereby incorporated herein by reference.

BACKGROUND OF THE INVENTION

Field of the Invention

The present invention generally relates to computer graphics and, more specifically, to techniques for viewing and searching documents included in collections of documents.

Description of the Related Art

Searching through large collections of documents, such as finding a particular research paper or set of research papers from within a large collection of research papers, can be a long and tedious process. Reviewing hard copies requires defining and obtaining a subset of documents, visually scanning each one, and expending substantial time reading candidate papers before the desired document is finally identified.

Digital libraries and browsing tools greatly improve the ability to find relevant material, allowing search based on textual metadata and analysis. Conventional keyword search may narrow the range of documents. However, in order to further explore a paper, the researcher must first download the document, then load it in an external portable document format (pdf) viewer, and finally read the document. This activity disrupts the flow of the literature review process.

Further, conventional browsing tools do not allow a researcher to use any of the visual qualities of the paper, such as the graphics and layout, to make a decision on whether further review is advisable. The appearance of a document, including figures within the document, equations, layout, as well as other visual qualities, all can provide the researcher with valuable clues to relevance of a document.

As the foregoing illustrates, what is needed in the art is a more effective technique for rapid exploration of large collections of documents and content.

SUMMARY OF THE INVENTION

One embodiment of the invention includes a computer-implemented method for viewing documents stored in a database including rendering a first composite image illustrating a graphical overview of the database that includes a plurality of first-sized images that correspond to a plurality of documents, rendering a second composite image that includes a plurality of second-sized images that correspond to a subset of the plurality of documents, rendering a third composite image that includes a plurality of variable-sized images that correspond to one or more pages of a first document included in the subset; and causing a graphical user interface (GUI) to display the first composite image, the second composite image, and the third composite image on a display device.

One advantage of the disclosed technique is that the visual qualities of a collection of research papers are made available as search criteria. The end-user is then able to seamlessly transition between finding, scanning, and reading documents of interest. Consequently, the end-user may identify desired content more quickly.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
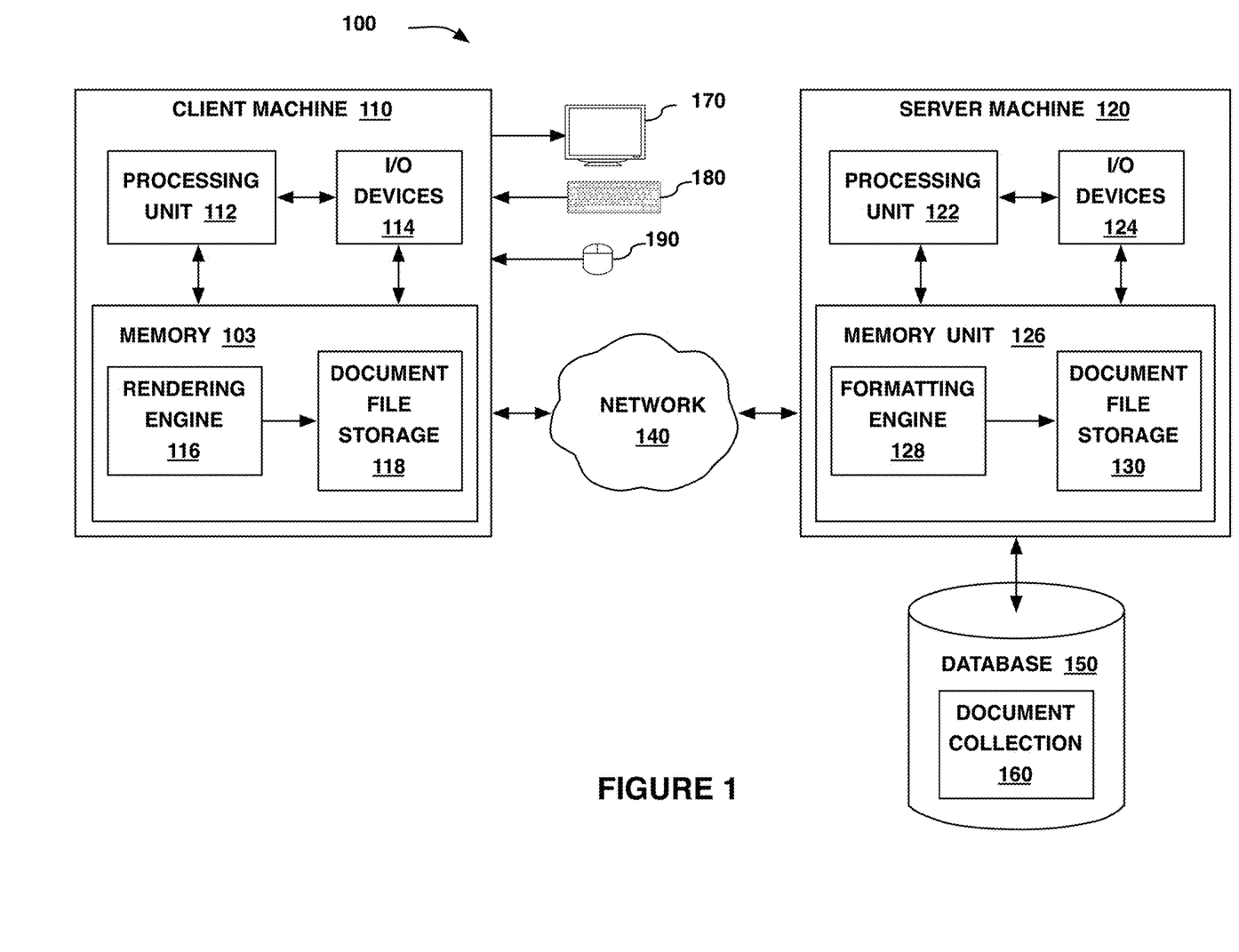
FIG. 1 illustrates a system configured to implement one or more aspects of the present invention.

FIG. 1 illustrates a system 100 configured to implement one or more aspects of the present invention. As shown, the system includes a client machine 110 coupled to a server machine 120 by network 140. Server machine 120 is also coupled to a database 150. Client machine 110 represents a client computing device configured to interact with server machine 120 in order to produce viewable graphic files as part of a computer-aided document search workflow. Client machine 110 may be a workstation, a laptop computer, a tablet or hand-held device, or any other device capable of displaying the output as discussed in detail further below in conjunction with FIGS. 2-4.

Client machine 110 includes processing unit 112 coupled to input/output (I/O) devices 114 and to memory 103. Processing unit 112 may be a central processing unit (CPU), a graphics processing unit (GPU), or a combination of different processing units, such as a CPU configured to operate in conjunction with a GPU. In general, processing unit 112 may be any technically feasible hardware unit capable of processing data and/or executing software applications. I/O devices 114 are also coupled to memory 103 and include devices capable of receiving input, devices capable of producing output, as well as devices capable of communicating via network 140. Client machine 110 communicates with server machine 120 over network 140 using I/O devices 114. Client machine 110 is further coupled to display device 170, keyboard 180, and mouse 190, which afford the end-user access to system 100. Memory 103 further includes rendering engine 116 and document file storage 118.

Server machine 120 is a computing device that may reside within a data center remote from client machine 110. Server machine 120 includes processing unit 122 coupled to I/O devices 124 and to memory unit 126. Processing unit 122 may be a central processing unit (CPU), a graphics processing unit (GPU), or a combination of different processing units, such as a CPU configured to operate in conjunction with a GPU. I/O devices 124 are also coupled to memory unit 126 and may include devices capable of receiving input, such as a keyboard, mouse, or other input elements, as well as devices capable of producing output such as a monitor, printer, or other output elements. Server machine 120 communicates with client machine 110 over network 140 using I/O devices 124. Memory unit 126 further includes formatting engine 128 and document file storage 130.

Server machine 120 is also coupled to database 150, which includes document collection 160. Document collection 160 may be a collection of research papers or of any other type of documents. The size of document collection 160 is such that the number of documents within the collection renders locating a particular document among the multitude of documents by conventional search means infeasible in a reasonable amount of time.

Server machine 120 accesses each individual document within document collection 160. Formatting engine 128 modifies and reworks the content of each document into a complement of data structures. These data structures generally provide successively higher resolution of document details and include a thumbnail view of all documents within the collection, an overview of all pages within each document, and an individual page view structure. These data structures are further described in subsequent figures. Formatting engine 128 then stores the complement of data structures in document file storage 130 in order to be available for transfer to client machine 110 upon request.

The end-user accesses document collection 160 by inputting commands to client machine 110 via display device 170, keyboard 180, mouse 190, and/or other I/O devices 114. In response to the end-user accessing document collection 160, client machine 110 initiates a request to server machine 120 to transfer the overall thumbnail document view, as described below in conjunction with FIG. 2, via network 140. Rendering engine 116 manipulates the data provided by server machine 120, in order to create viewable output via I/O devices 114. The end-user may then input keywords using display device 170, keyboard 180, mouse 190, and/or other I/O devices 114 in order to reduce the number of candidate documents. Client machine 110 transfers keywords to server machine 120, and server machine 120 responds by transferring additional higher resolution data structures for a reduced set of documents. These higher resolution data structures are described in greater detail below in conjunction with FIG. 3. Rendering engine 116 further manipulates the data provided by server machine 120, creates viewable data structures, and stores the resulting structures in document file storage 118.

The end-user then reviews the reduced number of candidate documents illustrated below in FIG. 3 by focusing on particular documents and requesting a more detailed view, as described below in conjunction with FIG. 4, from server machine 120. As the end-user views a requested document via I/O devices 114, server machine 120 anticipates subsequent requests and downloads data for related documents, as illustrated below in conjunction with FIG. 7, in order to reduce system latency.

Figure 2:
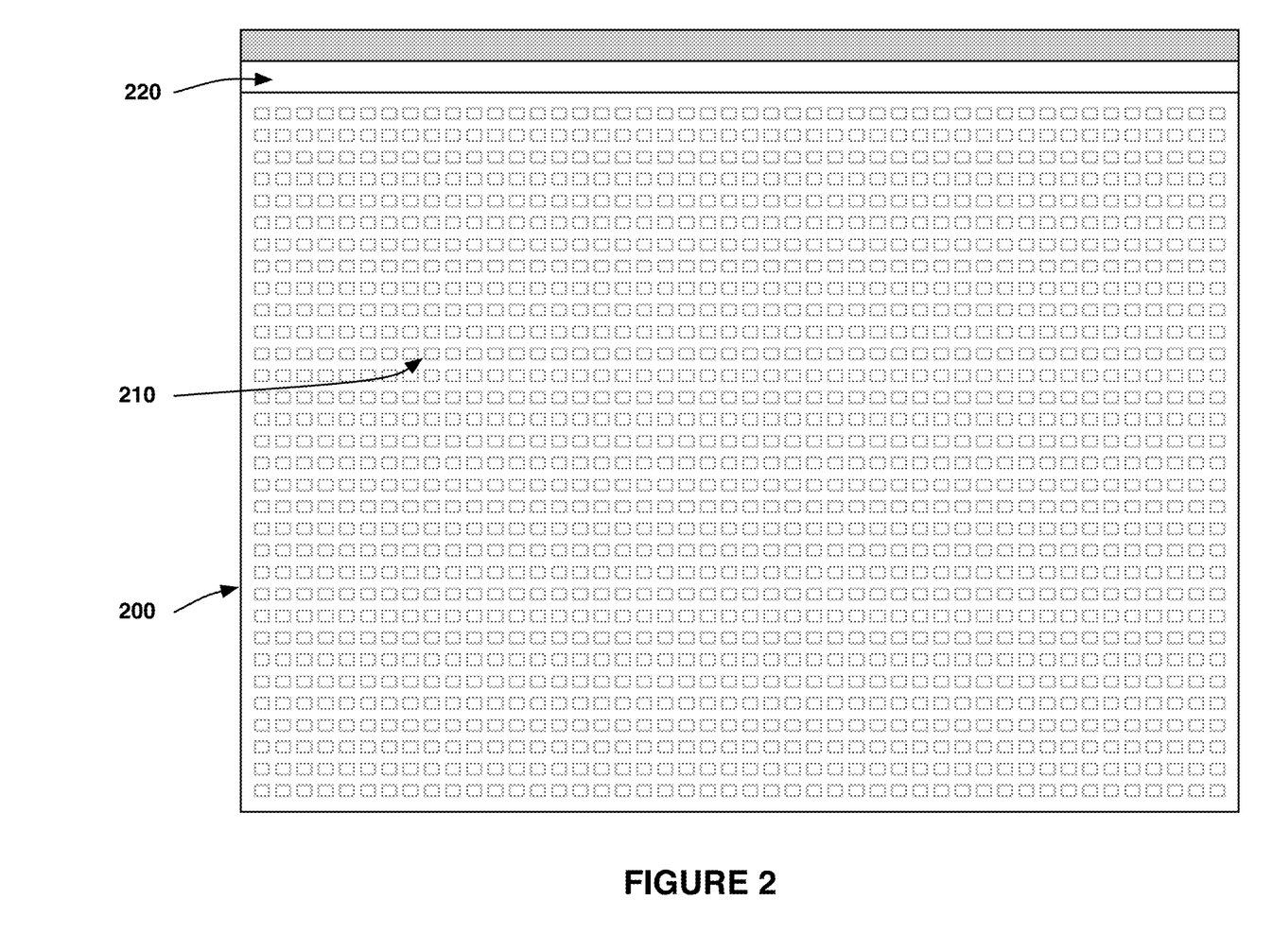
FIG. 2 is a screenshot a graphical user interface (GUI) configured to view a large collection of documents, according to one embodiment of the present invention.

FIG. 2 is a screenshot a graphical user interface (GUI) 200 configured to view a large collection of documents, according to one embodiment of the present invention. In operation, processing unit 112 displays GUI 200 on I/O devices 114 of client machine 110. As shown, GUI 200 includes graphics display array 210 and menu bar 220. Graphics display array 210 shows miniaturized thumbnails of all documents within document collection 160. Depending on the number of documents in document collection 160, the thumbnails of graphics display array 210 may not provide visual information on each document but give visual indication of the magnitude of document collection 160. Menu bar 220 includes interface controls for refining the displayed collection of documents. Interface controls may include search field, histogram filters, author list, search history, saved documents, or other information related to the document search process.

Figure 3:
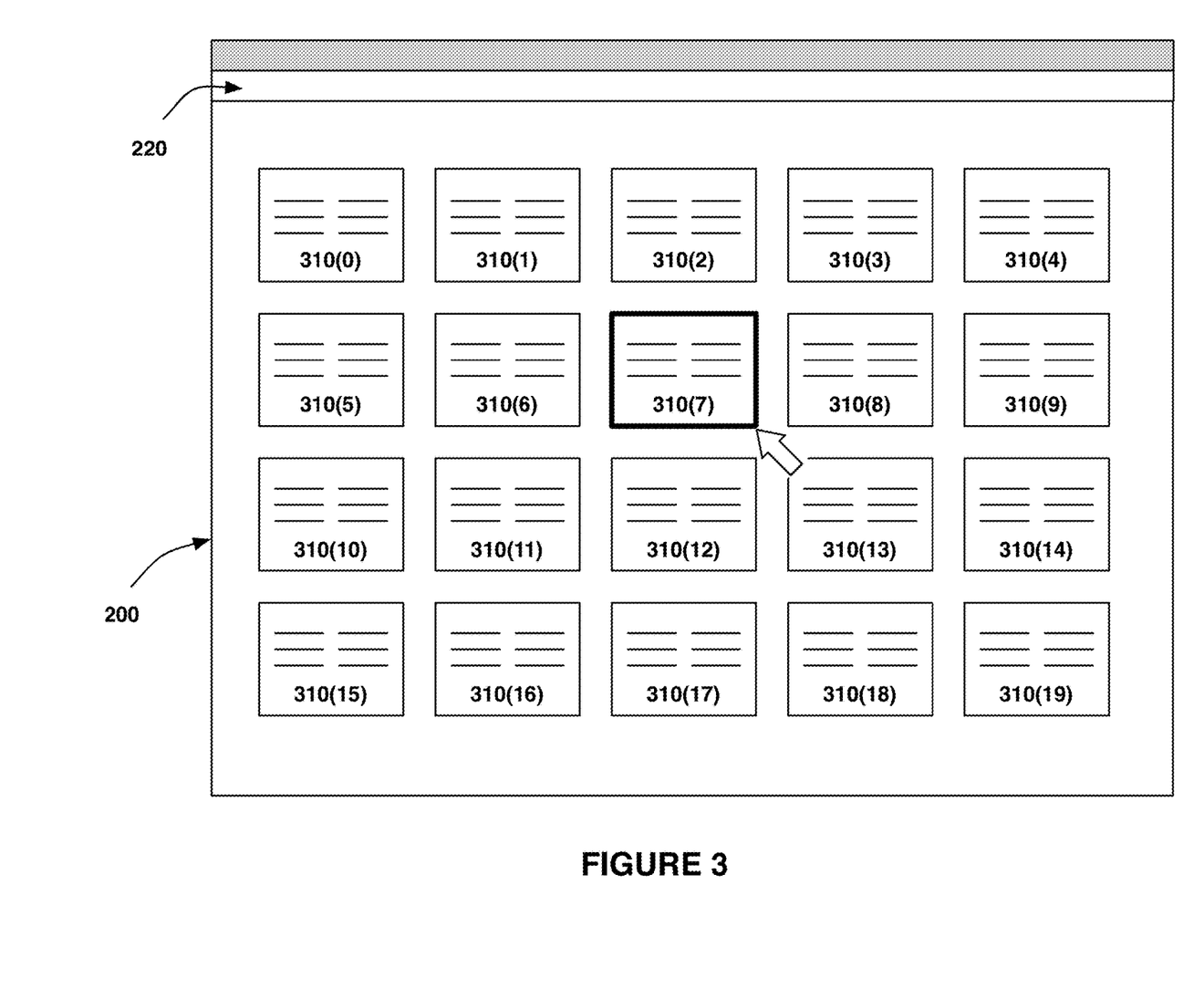
FIG. 3 is another screenshot of the GUI shown in FIG. 2 showing the response to a keyword search, according to one embodiment of the present invention.

FIG. 3 is another screenshot of the GUI shown in FIG. 2 showing the response to a keyword search, according to one embodiment of the present invention. As shown, GUI 200 includes similar elements as shown in FIG. 2, including menu bar 220. However, the content of graphics display array 210 now shows larger thumbnails 310(0) through 310(19).

In practice, the number of thumbnails returned by the search may vary depending on the specificity of the keyword search terms. Therefore, the readability of thumbnail 310 images may vary accordingly. For example, a search for a very general term may return a large number of documents such that the thumbnails 310 may be too small to provide visual clues for document selection. Conversely, a search for a very specific term or phrase may return a small number of documents such that the images provide visual information on the document content. FIG. 3 shows a case where thumbnails provide sufficient visual clues so that the end-user may initiate selection of, in this example, document thumbnail 310(7).

Figure 4:
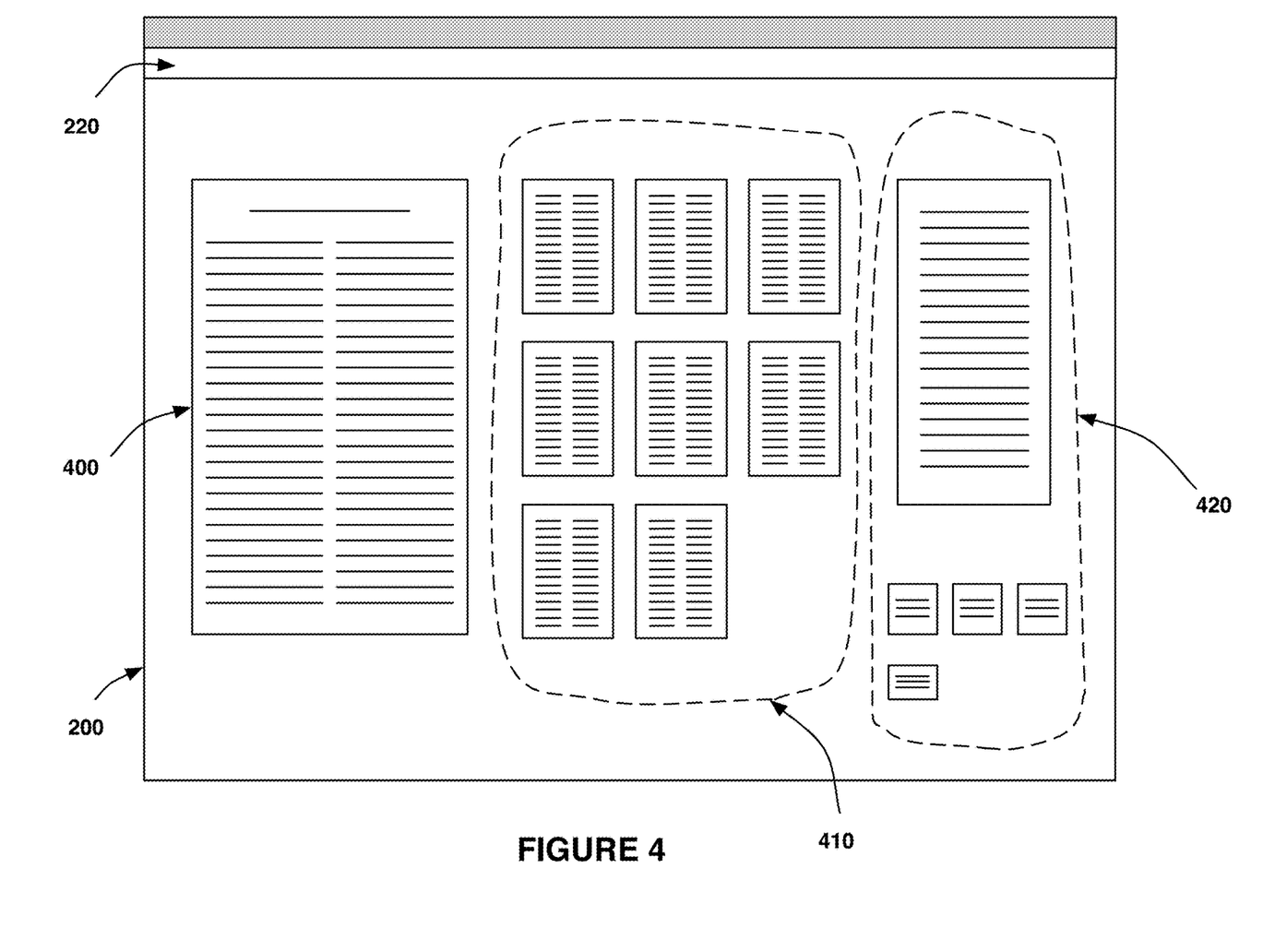
FIG. 4 is yet another screenshot of the GUI shown in FIG. 2 showing the page view of a selected document, according to one embodiment of the present invention.

FIG. 4 is yet another screenshot of the GUI shown in FIG. 2 showing the page view of a selected document, according to one embodiment of the present invention. The exemplary display content of GUI 200 in FIG. 4 is the result of the end-user selecting document thumbnail 310(7), as described above with respect to FIG. 3. As shown, GUI 200 includes page view 400, overall document view 410, and metadata display area 420.

Page view 400 is a readable view of a single page of the selected document. Overall document view 410 is a view of all other pages of the selected document. Metadata display area 420 shows additional information about the selected document, which may include title, abstract, authors, venue of presentation, and year among other data. The page view of GUI 200 may be expandable depending on the screen size of the hardware device that invokes GUI 200. For example, if a smartphone or a mini tablet invokes GUI 200, the page images as illustrated in conjunction with FIG. 4 may be too small to allow the end-user to efficiently read the document. The end-user may then expand the view illustrated in FIG. 4 in order to resize GUI 200 to render a readable image.

Figure 5:
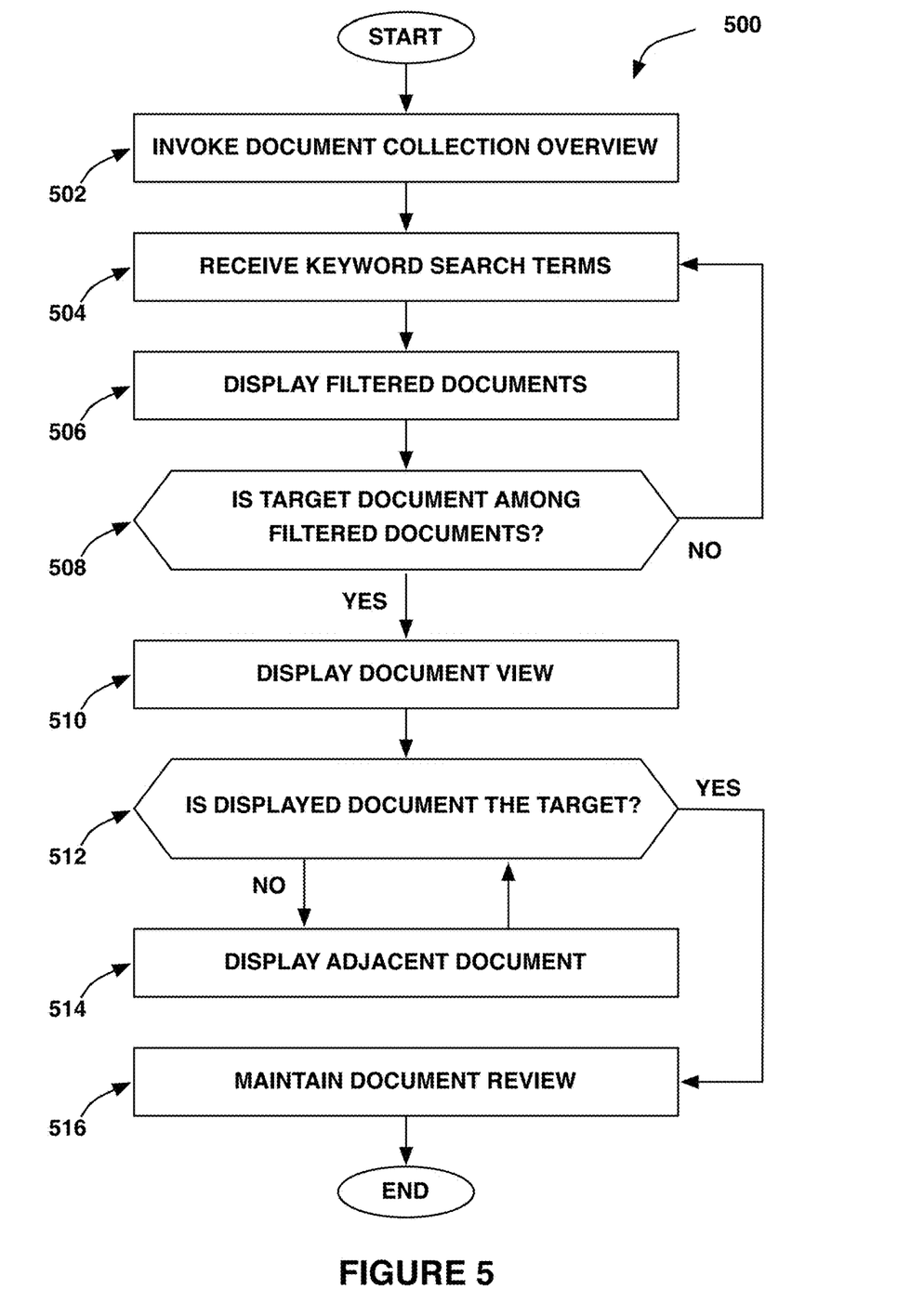
FIG. 5 is a flow diagram of method steps for searching and reviewing a document, according to one embodiment of the present invention.

FIG. 5 is a flow diagram of method steps for searching and reviewing a document, according to one embodiment of the present invention. Although the method steps are described in conjunction with the systems of FIGS. 1-4, persons skilled in the art will understand that any system configured to perform the method steps, in any order, is within the scope of the present invention.

As shown, a method 500 begins at step 502, where rendering engine 116, when executed by processing unit 112, invokes an overview of document collection 160 by transmitting a request to formatting engine 128, via network 140, and receiving, in turn, data that I/O devices 114 use to output graphics display array 210, as described above in conjunction with FIG. 2.

At step 504, rendering engine 116 receives keyword search terms as input via I/O devices 114 and transmits keyword search terms, via network 140, to formatting engine 128. At step 506, rendering engine 116, when executed by processing unit 112, transmits data that I/O devices 114 use to display the reduced thumbnail set, as described above in conjunction with FIG. 3. The reduced thumbnail set affords review of the filtered document set.

At step 508, rendering engine 116 interrogates I/O devices 114 for indication that the target document may be among the filtered document set illustrated in FIG. 3. If rendering engine 116 recieves indication via I/O devices 114 that the target document is not among filtered document set illustrated in FIG. 3, then the method 500 returns to step 504 where rendering engine 116 may receive a revised or extended keyword search term or terms via I/O devices 114 transmit.

If, at step 508, rendering engine 116 recieves indication via I/O devices 114 that a particular document among the documents displayed in the filtered document set of FIG. 3 may be the target document, then method 500 proceeds to step 510. At step 510, rendering engine 116 invokes the document view, as is shown in FIG. 4, by transmitting a request to formatting engine 128, via network 140, and receiving, in turn, data that I/O devices 114 use to display the page view set, as described above in conjunction with FIG. 4.

At step 512, rendering engine 116 interrogates I/O devices 114 for indication that the selected document is not the target document. If the selected document shown in the document view is not the target document, then method 500 proceeds to step 514. At step 514, rendering engine 116 may receive input, via I/O devices 114, to select a document that is adjacent to the prior selection in the thumbnail view. The method 500 then returns to step 512 where rendering engine 116 once again interrogates I/O devices 114 for indication that the selected document is not the target document.

If, at step 512, the selected document shown in the document view is, in fact, the target document, then method 500 proceeds to step 516. At step 516, rendering engine 116 maintains the document view, as is shown in FIG. 4, to allow completion of document review. The method then ends. By implementing the approach described above, method 500 allows the end-user to quickly navigate from the top-level view of the entire contents of document collection 160 to a reduced thumbnail view and, finally, to an individual page view, thus enabling a seamless search process to locate a target document with minimized system latency.

Figure 6:
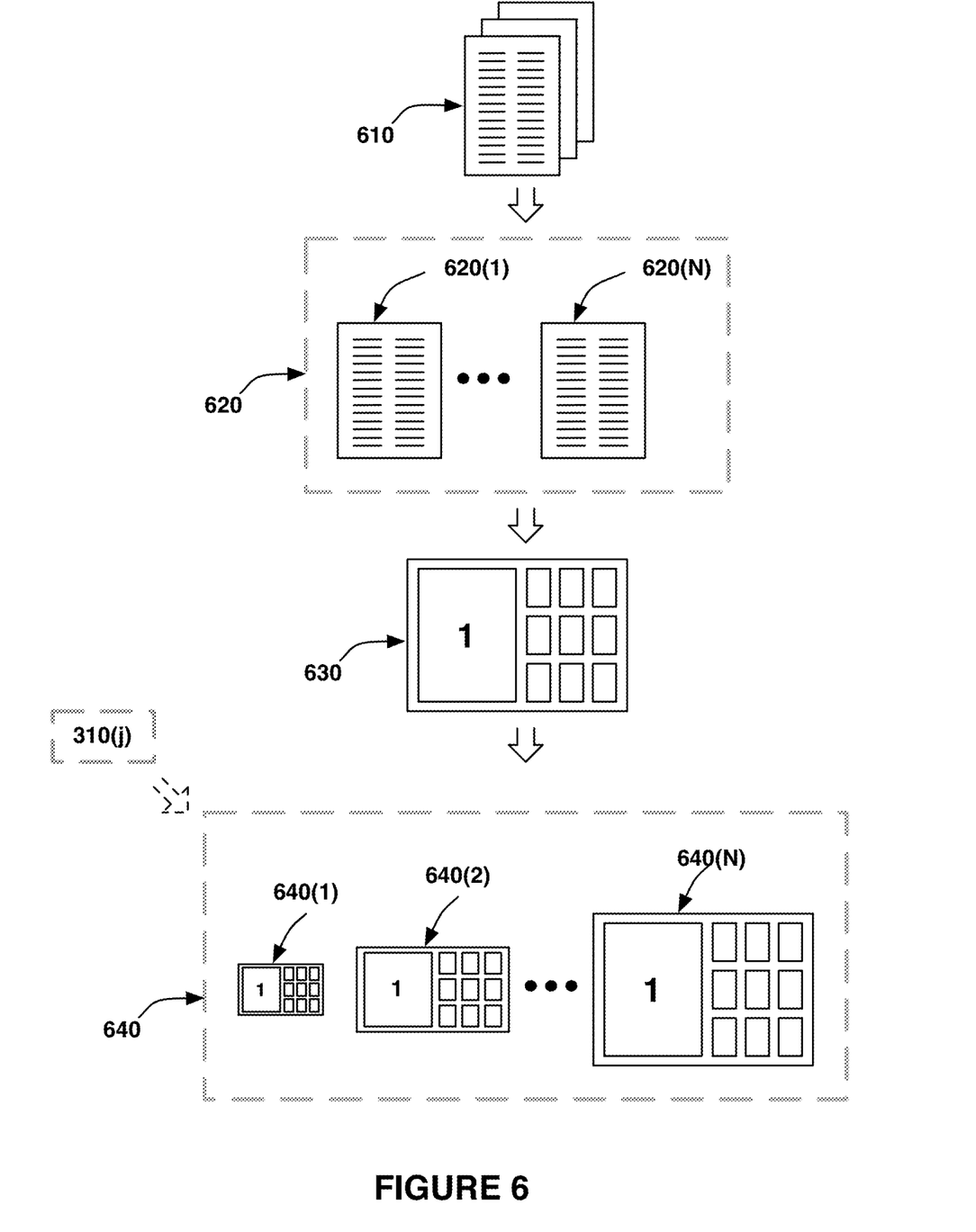
FIG. 6 illustrates the process of producing multi-resolution images, according to one embodiment of the present invention.

FIG. 6 illustrates the process of producing multi-resolution images, according to one embodiment of the present invention. As shown, document file 610 is the top-level data file for a particular instance of a document within document collection 160 and includes all text and graphics for the document. Document file 610, which may be in, for example, pdf format, includes a composite of all pages of the document within the top-level file structure.

Processing unit 122 retrieves document file 610 from document collection 160. Processing unit 122 then splits document file 610 into separate files for each page to create a complement of page files 620. As shown, the complement of page files 620 includes individual page files, 620(1) through 620(N), for each page of document file 610 and may be, for example, in joint photographic experts group (JPEG) format. Formatting engine 128 generates the complement of page files 620 and stores the individual data files in document file storage 130.

Composite page file 630 is a single flattened image that includes a combination of the page views included in the complement of page files 620. Formatting engine 128 creates composite page file 630 from page files 620 via a graphics utility, which may include, for example, a raster graphics editor such as Photoshop.

Multi-resolution image 640 is an image pyramid, which is a collection of the data of composite page file 630 rendered in multiple instances with successively increasing resolutions. Formatting engine 128 creates multi-resolution image 640 document to afford the end-user an efficient means of reviewing each page of document 610. When the end-user selects a thumbnail 310(j), formatting engine 128 invokes an instance of multi-resolution image 640 corresponding to the document illustrated in thumbnail 310(j).

In one embodiment, the number of levels of resolution that formatting engine 128 generates in multi-resolution image 640 may vary with respect to the size and content of the document. For example, the image pyramid for a larger document, such as a document with multiple pages, could include multiple levels of increasing resolution. In practice, the image pyramid may include twelve levels of increasing resolution and rendering engine 116 then interpolates between those levels to generate images for display. Persons skilled in the art will recongizen that any number of levels also falls within the scope of the present invention. In addition, the image pyramid for a smaller document, such as a document with a single page or a single image, may include a single view which rendering engine 116 may then expand, in response to user zooming, to show various sections of the image with increased resolution. In this fashion, rendering engine 116 may show increasing detail until reaching the full resolution of the image.

Referring back now to FIG. 3, as is shown, thumbnail 310(7) resides adjacent to thumbnails 310(6) and 310(8). As described in conjunction with FIG. 6, when the end-user selects thumbnail 310(7), formatting engine 128 generates multi-resolution image 640 and transfers multi-resolution image 640 to client machine 110 for display based on thumbnail 310(7).

In addition, formatting engine 128 may also generate a multi-resolution image 640 for each of thumbnails 310(6) and 310(8), and then transfer that data to client machine 110, in anticipation of the end-user selecting one of those adjacent thumbnails. With this approach, client machine 110 may "cache" the complement of images associated with a non-selected thumbnail that is close to a selected thumbnail to reduce latency when the non-selected thumbnail image is eventually selected. This process is illustrated below in conjunction with FIG. 7.

Figure 7:
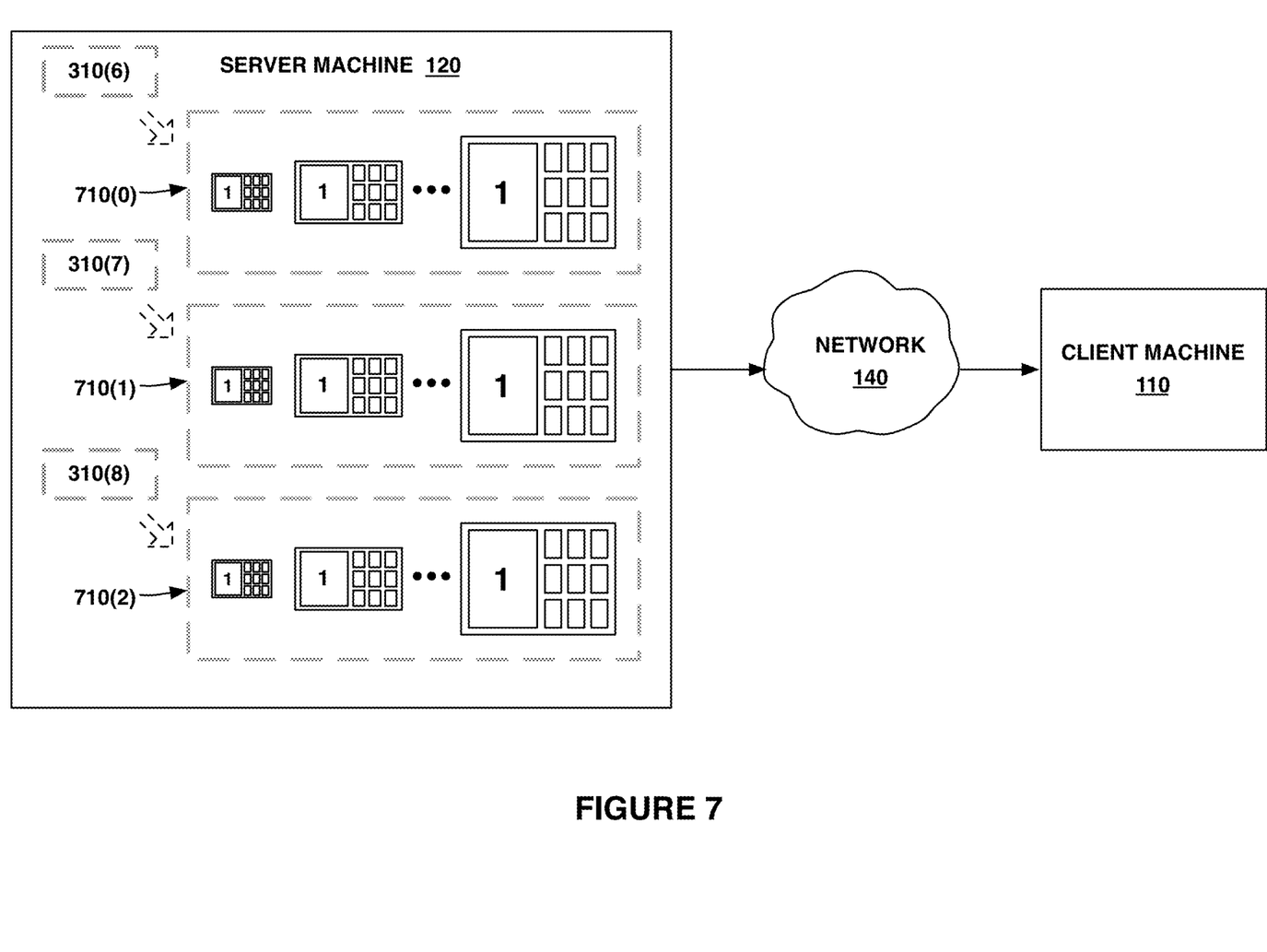
FIG. 7 illustrates the process of transferring related multi-resolution images, according to one embodiment of the present invention.

FIG. 7 illustrates the process of generating and transferring related multi-resolution images, according to one embodiment of the present invention. As shown, data file set 710(1) includes the multi-resolution image 640 associated with thumbnail 310(7). Data file set 710(0) includes the multi-resolution image 640 associated with thumbnail 310(6). Data file set 710(2) includes the multi-resolution image 640 associated with thumbnail 310(8).

Server machine 120 transfers data file set 710(1) in response to an end-user request. Server machine 120 further transfers data file set 710(0) and data file set 710(2) to client machine 110 via network 140 in anticipation of further searching by client machine 110. In this manner, as described above, client machine 110 may search adjacent files without incurring additional latency due to file transfer time delay. Having potentially related documents readily available without need for further server access reduces search time and maintains the flow of the review process.

Figure 8:
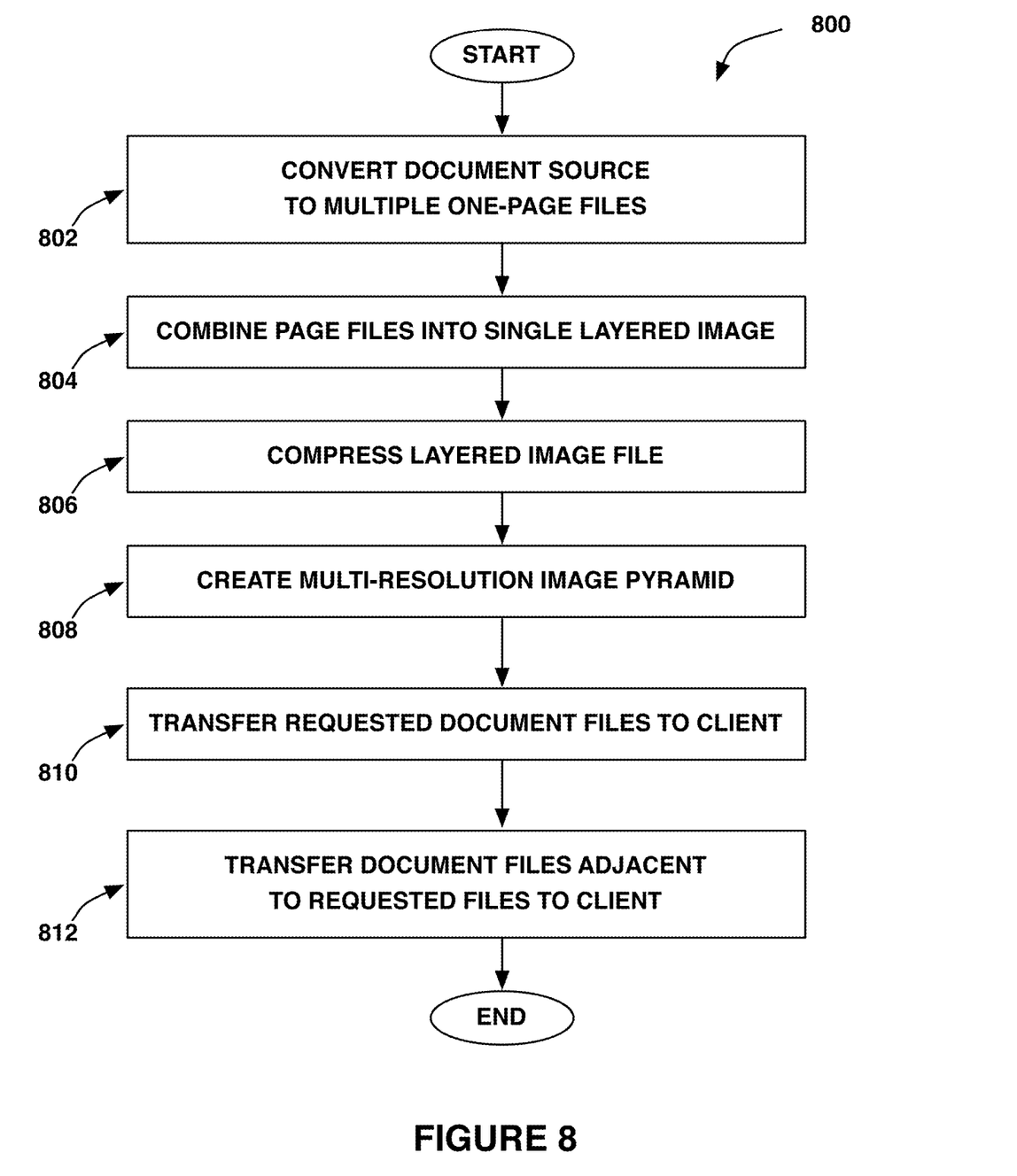
FIG. 8 is a flow diagram of method steps for generating and managing multi-resolution images, according to one embodiment of the present invention.

FIG. 8 is a flow diagram of method steps for generating and managing multi-resolution images, according to one embodiment of the present invention. Although the method steps are described in conjunction with the systems of FIGS. 1-4, and 6-7, persons skilled in the art will understand that any system configured to perform the method steps, in any order, is within the scope of the present invention.

As shown, a method 800 begins at step 802 where formatting engine 128, when invoked by processing unit 122, retrieves a document source file from document collection 160 and converts the data content into multiple one-page files. In step 804, formatting engine 128 combines the multiple one-page files into a single graphics file. In step 806, formatting engine 128 compresses the graphics file of combined page images into a readable format, for example, JPEG or other graphics standard file. In step 808, formatting engine 128 generates a multi-resolution image pyramid for each document.

In step 810, upon a request from rendering engine 116, formatting engine 128 transfers the complement of readable files for the requested document to client machine 110 via network 140. In step 812, rendering engine 116 transfers the complements of readable files for the two documents that are adjacent to the requested document in the thumbnail display of GUI 200 as described above in conjunction with FIG. 7. Transferring the adjacent documents allows the end-user to seamlessly transition between searching and reading while minimizing system latency by anticipating end-user needs and, thus, minimizing the time to load documents.

In sum, a computing device is configured to generate a graphical user interface (GUI) that allows an end-user to search for particular document or documents within a large collection of documents. The GUI provides a view of the overall document collection and affords the end-user the ability to reduce the number of visual document thumbnails by means of keyword search. When the end-user identifies a candidate among the reduced number of thumbnails, the end-user may select the page view of the candidate document and conduct further review. If the selected candidate is not the target document, the end-user may select adjacent documents to seamlessly transition between reading and searching.

Advantageously, the visual qualities of a collection of documents, such as images, graphical layout, and color, among others, may be incorporated into the search process, thereby allowing the end-user to identify desired content more quickly. The GUI provides a seamless transition between finding, scanning, and reading documents of interest. Searching for a particular target document is, thus, expedited.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for viewing documents stored in a database, the method comprising:
retrieving a document file associated with a first document from the database;
splitting the document file into separate page files, wherein each of the separate page files is associated with a different page of the first document;
generating a composite page file by merging at least two of the separate page files;
generating a first composite image based on the composite page file, wherein the first composite image includes a plurality of rendered instances of the composite page file, wherein each rendered instance is associated with a different resolution level included in a plurality of resolution levels and comprises a visual representation of the composite page file at the different resolution level, and wherein a total number of resolution levels included in the plurality of resolution levels depends on a size of the first document; and
causing a graphical user interface (GUI) to display the first composite image on a display device.

2. The computer-implemented method of claim 1, wherein the first document is included in a plurality of documents, and each document included in the plurality of documents is identified via keyword search term input by a user.

3. The computer-implemented method of claim 1, wherein the first composite image further includes metadata indicating at least one of a title, an abstract, one or more authors, a venue, and a year, associated with the first document.

4. The computer-implemented method of claim 1, wherein generating the composite page file further comprises:
compressing the at least two of the separate page files to generate compressed page files; and
merging the compressed page files to generate a first rendered instance.

5. The computer-implemented method of claim 1, further comprising:

generating a second composite image illustrating a graphical overview of the database that includes a plurality of first-sized images, wherein each first-sized image corresponds to a different document in a plurality of documents, wherein the first document is included in the plurality of documents; and causing a graphical user interface (GUI) to display the second composite image on a display device.

6. The computer-implemented method of claim 5, further comprising:

generating a third composite image that includes a plurality of second-sized images, wherein each second-sized image corresponds to a different document in the plurality of documents; and causing a graphical user interface (GUI) to display the third composite image on a display device.

7. The computer-implemented method of claim 6, wherein each image included in the plurality of first-sized images comprises a thumbnail image that is smaller than a corresponding image included in the plurality of second-sized images.

8. The computer-implemented method of claim 6, further comprising:

identifying a second document in the third composite image that is adjacent to the first document in the plurality of documents; and generating a fourth composite image that correspond to the second document.

9. The computer-implemented method of claim 8, further comprising displaying the previously-generated fourth composite image in response to receiving a selection from the end-user of the second document in the third composite image.

10. A non-transitory computer-readable medium storing program instructions that, when executed by a processing unit, cause the processing unit to facilitate viewing documents stored in a database by performing the steps of:

retrieving a document file associated with a first document from the database;

splitting the document file into separate page files, wherein each of the separate page files is associated with a different page of the first document;

generating a composite page file by merging at least two of the separate page files;

generating a first composite image based on the composite page file, wherein the first composite image includes a plurality of rendered instances of the composite page file, wherein each rendered instance is associated with a different resolution level included in a plurality of resolution levels and comprises a visual representation of the composite page file at the different resolution level, and wherein a total number of resolution levels included in the plurality of resolution levels depends on a size of the first document; and causing a graphical user interface (GUI) to display the first composite image on a display device.

11. The non-transitory computer-readable medium of claim 10, wherein each document included in a plurality of documents is identified via keyword search term input by a user.

12. The non-transitory computer-readable medium of claim 10, wherein a plurality of variable-sized images includes a first image having a first resolution that corresponds to a first page of the first document and a second image having a second resolution that corresponds to a second page of the first document, wherein the first resolution exceeds the second resolution.

13. The non-transitory computer-readable medium of claim 10, wherein the first composite image further includes metadata indicating at least one of a title, an abstract, one or more authors, a venue, and a year, associated with the first document.

14. The non-transitory computer-readable medium of claim 10, wherein generating the composite page file further comprises the steps of:

compressing the at least two of the separate page files to generate compressed page files; and merging the compressed page files to generate a first variable-sized image.

15. The non-transitory computer-readable medium of claim 10, further comprising the steps of:

generating a second composite image illustrating a graphical overview of the database that includes a plurality of first-sized images, wherein each first-sized image corresponds to a different document in a plurality of documents, wherein the first document is included in the plurality of documents;

generating a third composite image that includes a plurality of second-sized images, wherein each second-sized image corresponds to a different document in the plurality of documents; and causing a graphical user interface (GUI) to display the second composite image and the third composite image on a display device.

16. The non-transitory computer-readable medium of claim 15, wherein each image included in the plurality of first-sized images comprises a thumbnail image that is smaller than a corresponding image included in the plurality of second-sized images.

17. The non-transitory computer-readable medium of claim 15, further comprising the steps of:

identifying a second document in the third composite image that is adjacent to the first document; and generating a fourth composite image that correspond to the second document.

18. A system configured for viewing documents stored in a database, including:

a memory unit;

a processing unit coupled to the memory unit and configured to:

retrieve a document file associated with a first document from the database;

split the document file into separate page files, wherein each of the separate page files is associated with a different page of the first document;

generate a composite page file by merging at least two of the separate page files;

generate a first composite image based on the composite page file, wherein the first composite image includes a plurality of rendered instances of the composite page file, wherein each rendered instance is associated with a different resolution level included in a plurality of resolution levels and comprises a visual representation of the composite page file at the different resolution level, and wherein a total number of resolution levels included in the plurality of resolution levels depends on a size of the first document; and cause a graphical user interface (GUI) to display the first composite image on a display device.

19. The system of claim 18, wherein the processing unit is further configured to generate the composite page file by:

compressing one or more single page files; and merging two or more compressed page files to generate a first variable-sized image.

20. The system of claim 18, further comprising:
the processing unit coupled to the memory unit and configured to:
generate a second composite image illustrating a graphical overview of the database that includes a plurality of first-sized images, wherein each first-sized image corresponds to a different document in a plurality of documents, wherein the first document is included in the plurality of documents;
generate a third composite image that includes a plurality of second-sized images, wherein each second-sized image corresponds to a different document in the plurality of documents; and
cause a graphical user interface (GUI) to display the second composite image and the third composite image on a display device.

21. The system of claim 20, wherein the processing unit is further configured to:
identify a second document in the third composite image that is adjacent to the first document; and
generate a fourth composite image that correspond to the second document.

* * * * *